March 20, 1945.  E. E. STEVENSON  2,371,857
SAFETY BRAKE MECHANISM
Filed Feb. 15, 1944  4 Sheets-Sheet 1

Inventor:
EDWARD E. STEVENSON,
By
Attorney.

March 20, 1945.  E. E. STEVENSON  2,371,857
SAFETY BRAKE MECHANISM
Filed Feb. 15, 1944  4 Sheets-Sheet 2

Inventor:
EDWARD E. STEVENSON,
By
Attorney.

March 20, 1945.　　　E. E. STEVENSON　　　2,371,857
SAFETY BRAKE MECHANISM
Filed Feb. 15, 1944　　　4 Sheets-Sheet 3
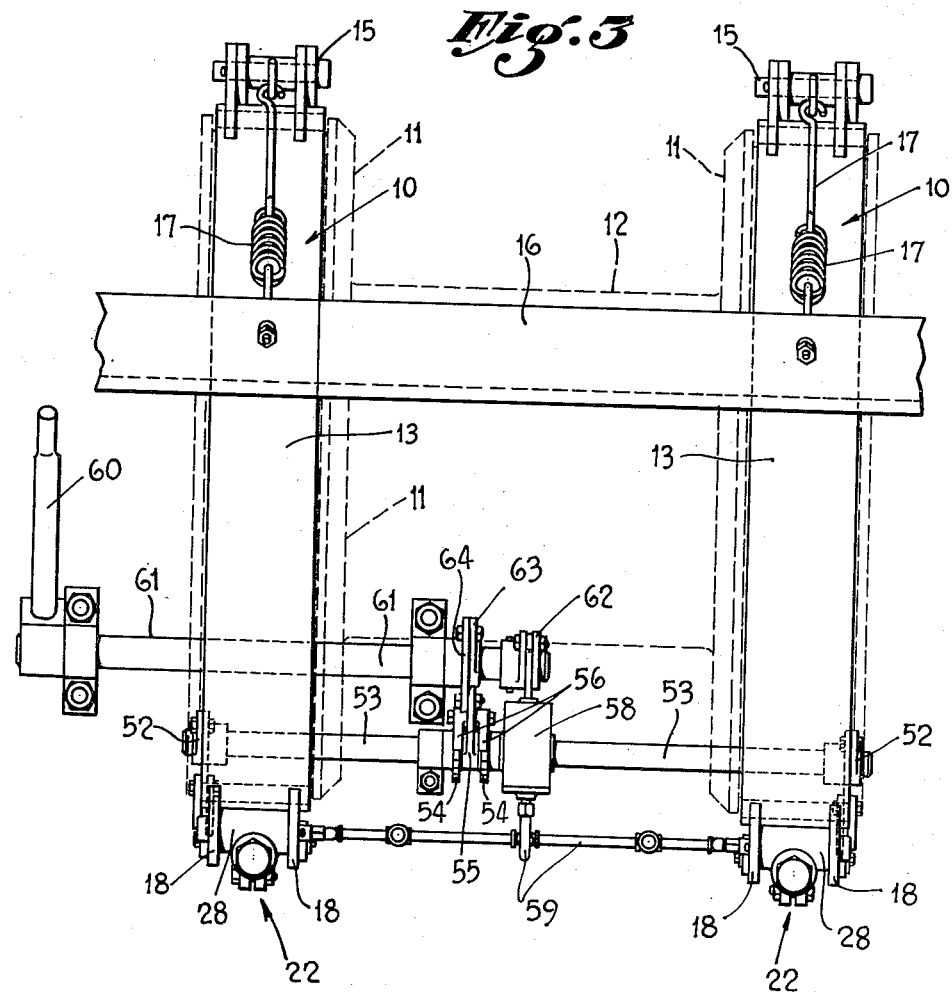
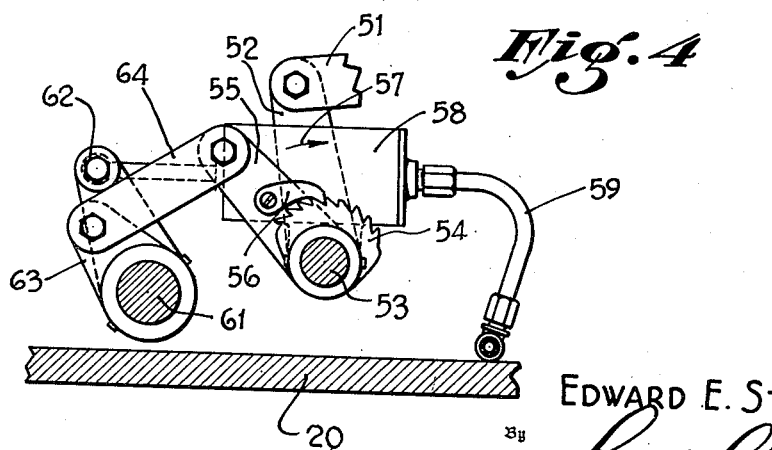
Inventor:
EDWARD E. STEVENSON,
By
Attorney.

March 20, 1945.   E. E. STEVENSON   2,371,857
SAFETY BRAKE MECHANISM
Filed Feb. 15, 1944   4 Sheets-Sheet 4
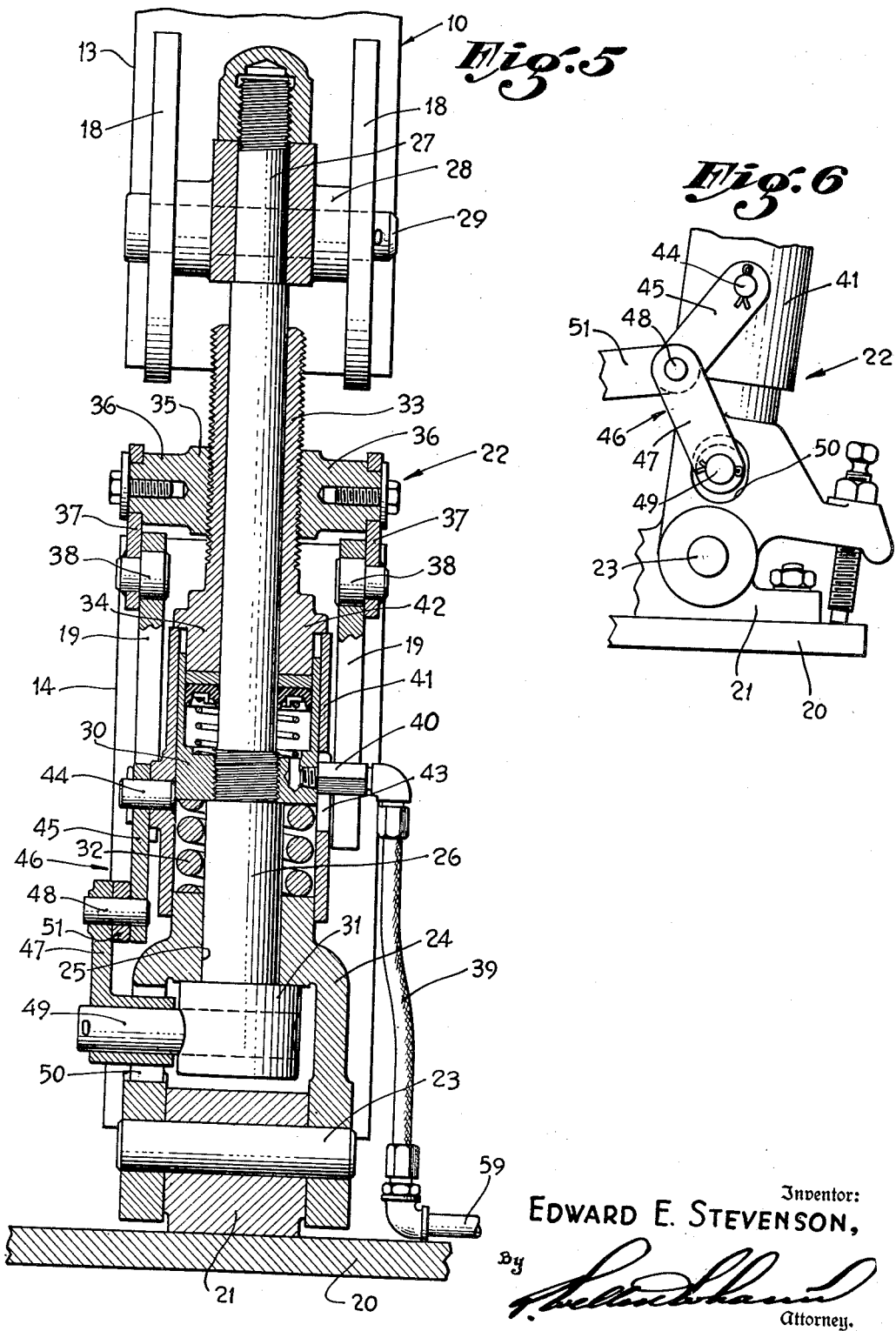
Inventor:
EDWARD E. STEVENSON,
By
Attorney.

Patented Mar. 20, 1945

2,371,857

UNITED STATES PATENT OFFICE 2,371,857

SAFETY BRAKE MECHANISM

Edward E. Stevenson, Los Angeles, Calif., assignor to Emsco Derrick & Equipment Company, Los Angeles, Calif., a corporation of California Application February 15, 1944, Serial No. 522,418

11 Claims. (Cl. 188—105)

My invention relates to heavy duty brakes such as used with drawworks of rotary drilling equipment, and relates in particular to a hydraulic brake having hydraulic means for the ordinary application of the brakes and mechanical means which will automatically actuate the brake in event of failure of the hydraulic system.

It is an object of the invention to provide a brake of this character having a brake which is moved toward and away from a brake drum by a part which is moved by fluid pressure resulting from movement of a control lever, and toggle link means, one end of which is connected to the movable part, this toggle link means being also actuated by the lever so as to produce movement of the brake applying part in event of failure of the device to apply fluid pressure.

It is an object of the invention to provide a device of the above character wherein the brake comprises a circular band surrounding a brake drum, this band being actuated by a member which slides on a tangential guide, with a toggle mechanism for moving the member on the tangential guide without interfering with the movement of the guide toward and away from the drum as required during the operation of the brake.

A further object of the invention is to provide in a brake having means for absorbing the kickback which sometimes occurs during the operation of the brake, a brake mechanism having both hydraulic and mechanical actuating means operating in sequence without interfering with the kick-back function of the brake mechanism.

A further object of the invention is to provide a mechanical follow-up for a heavy duty hydraulic brake of the character described having a pair of brake bands, this follow-up mechanism having in association with the operating means for the separate bands mechanically actuated parts which are automatically adjusted in follow-up relation to the hydraulic brake actuating means.

Further objects and advantages will be brought out in the following part of the specification.

Referring to the drawings which are for illustrative purposes only,

Fig. 3 is a plan view of Fig. 1.

Fig. 4 is an enlarged fragmentary section taken as indicated by the line 4—4 of Fig. 1.

Fig. 5 is an enlarged fragmentary section taken on the plane indicated by the line 5—5 in Fig. 2.

Fig. 6 is a fragmentary elevational view showing the toggle means forming a part of the present invention.

Figure 2:
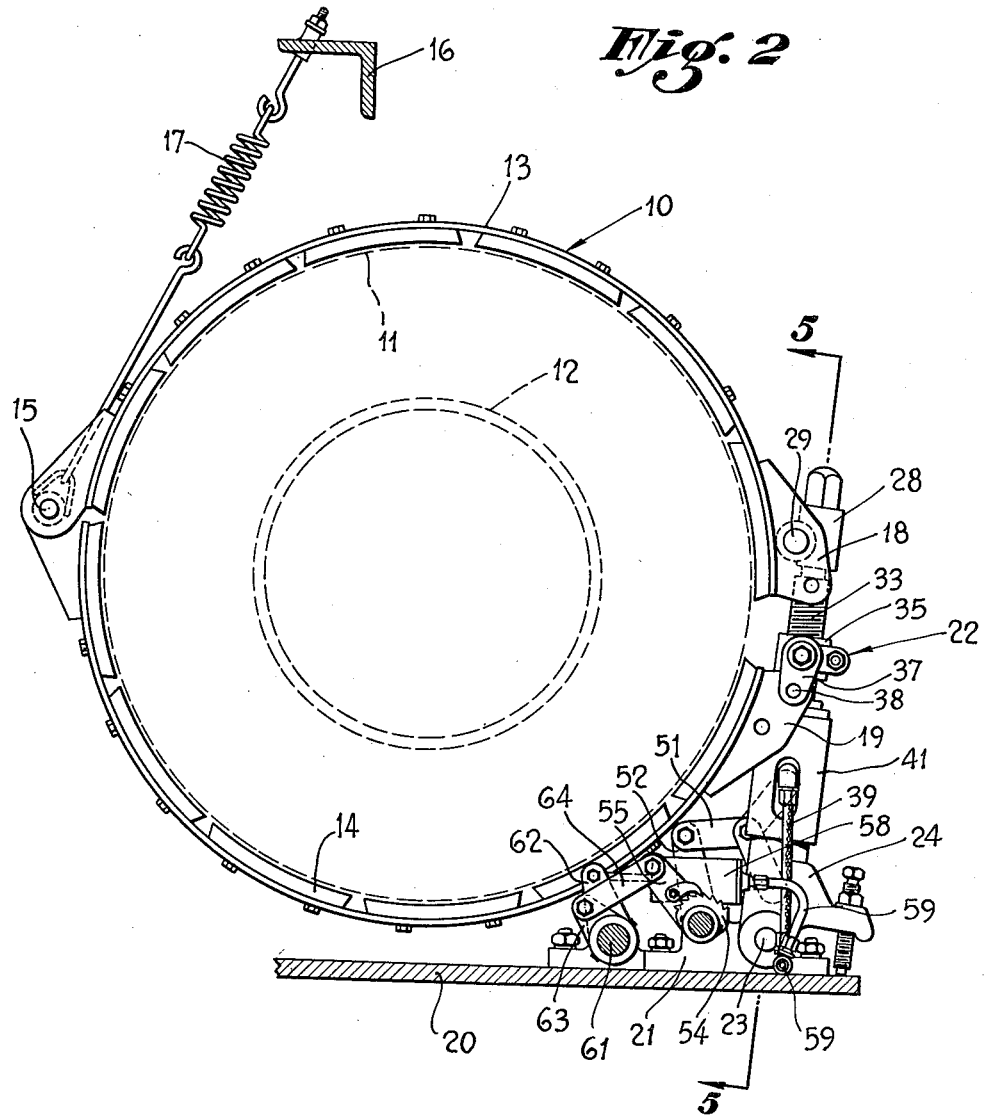
Fig. 2 is a sectional view taken as indicated by the line 2—2 of Fig. 1.

In the form of the invention shown, a pair of band brakes 10 are disposed in cooperative relation to brake drums 11, which, as shown in phantom lines, are disposed at the ends of a spool 12 of a drawworks, upon which cable is wound. As shown in Fig. 2, each of the band brakes comprises an upper semicylindrical member 13 and a cooperating lower semicylindrical member 14, the rear ends of which are connected by a hinge 15 yieldably supported from a cross member 16 by means of a spring suspension 17.

The front ends of the upper brake band members 13 are provided with projecting plates 18, and the front ends of the lower members 14 are provided with projecting plates 19.

On the base 20 which extends under the cable spool 12 there are supporting brackets 21, each of which is disposed below the plates 19 of a separate one of the lower band members 14. Each supporting bracket 21 supports a brake operating mechanism 22 so that for the two separate band brakes 10 there will be an individual brake operating mechanism. Each of these brake operating mechanisms is constructed in accordance with the enlarged views Figs. 5 and 6. Therefore, it will be understood that the description of one of the brake operating mechanisms 22 as shown in Figs. 5 and 6 will serve for both of them.

A pin 23 carried by each supporting bracket 21 pivotally supports a forked fitting 24 having in the upper part thereof a nearly vertical opening 25, in which a guide bar 26 is vertically slidable through a limited distance, as will be hereinafter described. This guide bar is positioned so that it passes between the upper and lower plates 18 and 19 which project forwardly from the front ends of the band members 13 and 14. The upper end 27 of the bar 26 is connected by a swivel head 28 and a pin 29 to the plates 18. In this manner the bar 26 serves as an anchor for preventing upward movement of the front end of the band member 13, but permitting a slight inward movement of the front end of the band 13 as the brake is actuated.

A hydraulic cylinder 30 is secured on the bar 26 in spaced relation to the head 31 which forms the lower extremity of the bar 26, and a relatively heavy helical spring 32 is disposed between the lower face of the cylinder 30 and the upper end of the fitting 24 so that the head 31 of the bar is normally held upwardly in tight engagement with the upper wall of the fitting 24. An externally threaded sleeve 33 is slidable upon the bar 26 below the swivel head 28, and at the lower end of the sleeve 33 an annular piston 34 is formed, this piston 34 projecting downwardly into the cylinder 30 in the manner shown. On the sleeve 33 above the piston 34 a nut 35 is threaded, which nut has projections 36 carrying depending links 37 which are pivotally connected to the plates 19 at the forward end of the lower band member 14 by pins 38. When hydraulic fluid is fed under pressure through conduit means 39 into the cylinder 30 so that its pressure will be applied to the lower face of the piston 34, the sleeve 33 will be forced upward, thereby moving the front end of the lower band member 14 upward and contracting the brake band 10 into frictional engagement with the associated brake drum 11.

A sleeve 41 is placed around the cylinder 30 in vertically sliding relation thereto, the upper end of this sleeve 41 being adapted to engage an annular shoulder 42 on the piston 34. The sleeve has therein a vertical slot 43 through which a nipple 40 passes to connect the conduit 39 with the interior of the cylinder 30. Diametrally opposed to the slot 43, the sleeve carries a pin or trunnion 44 to which the upper link 45 of a toggle 46 is connected, this toggle 46 having a lower link 47, the upper end of which is connected to the lower end of the upper link 45 by a transverse pin 48, the toggle means constituting a mechanical means connected between the guide 26 and the sleeve 41. From the head 31 of the lower end of the bar 26, a trunnion 49 projects laterally through an opening 50 in the fitting 24 and receives thereon the lower end of the lower link 47. To actuate the toggle 46, an actuating link 51 is connected to the pin 48 between the links 45 and 47.

Figure 1:
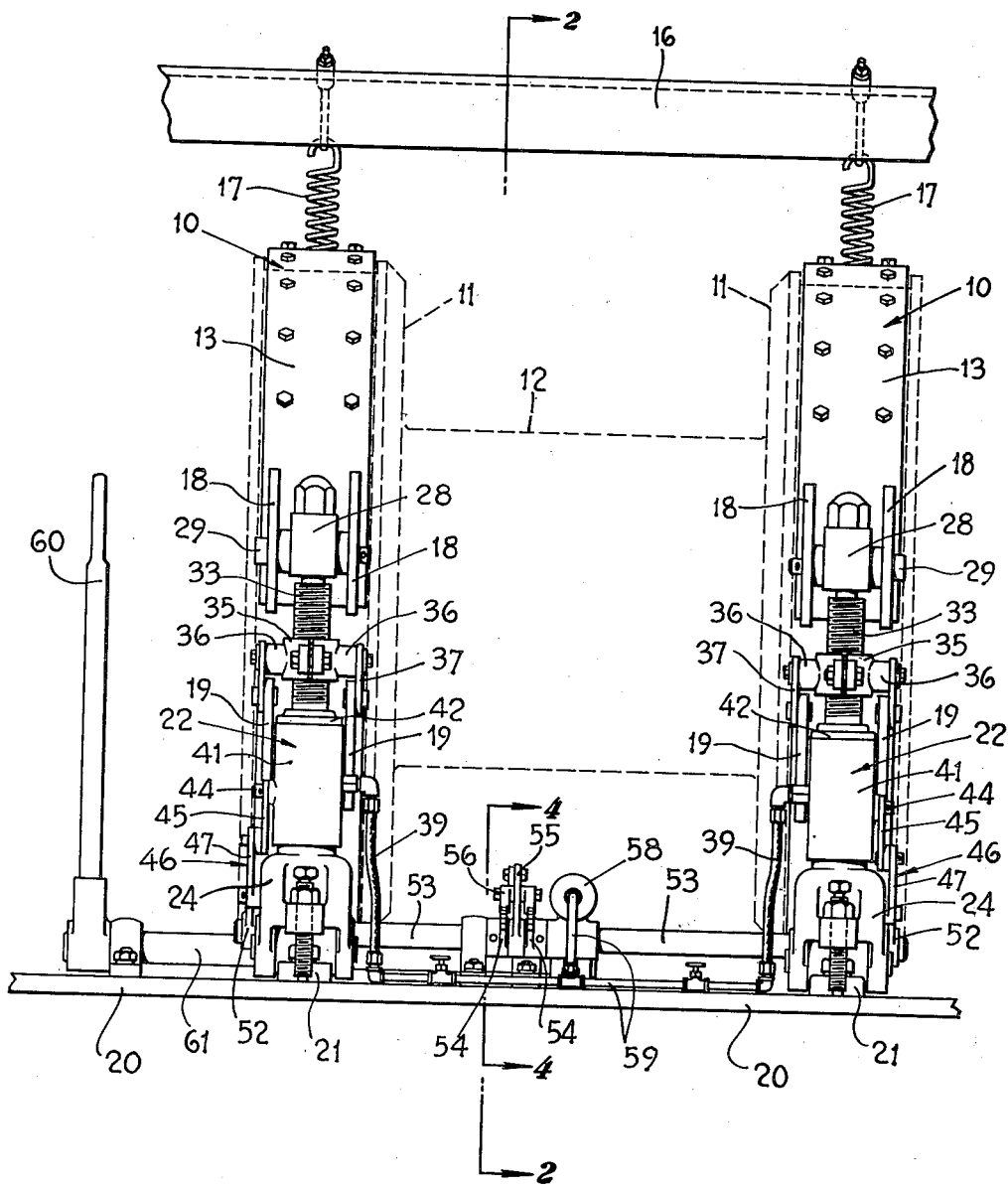
Fig. 1 is a front elevation of a heavy duty brake embodying a preferred form of my invention.

The actuating link 51 extends substantially horizontally and is connected to the upper end of a lever 52 which is fixed on an end of a horizontal shaft 53. Swinging motion transmitted from the shaft 53 through the lever 52 to the link 51 will act to straighten the toggle 46, thereby lifting the sleeve 41 which will in turn lift the threaded sleeve 33 so as to contract the associated brake band 10 as shown in Figs. 1 and 3. The shafts 53 for actuating the two separate toggles 46 are axially aligned and extend toward each other. On the adjacent ends of these shafts 53 there are ratchets 54 which are disposed on opposite sides of a lever 55 which carries two pawls 56 to engage the ratchets 54 in the manner shown in Fig. 4, whereby forward movement of the lever 55, indicated by the arrow 57, will result in rotation of the shafts 53 and forward swinging movement of the levers 52 to straighten the toggles 46.

For actuation of the hydraulic pistons 34, a master cylinder 58 is provided, the outlet of which is connected to the conduit 39 through piping 59. The driller operates the master cylinder 58 through motion applied to a lever 60 which is fixed on one end of the shaft 61 extending in parallel relation to the shaft 53. The shaft 61 has fixed thereon a lever 62 which is connected to the master cylinder 58 for actuation thereof. On the shaft 61 there is a second lever 63 which lies behind the lever 55 and is connected thereto by a link 64 so that when the manually operated lever 60 is swung forwardly, there will be an actuation of the master cylinder 58 and a forward movement of the lever 55. Accordingly, the feeding of hydraulic fluid under pressure into the cylinder 30 will move the piston 34 upward and at the same time there will be an upward movement of the sleeve 41, but the parts are so proportioned that during the normal operation of the brakes, the piston 34 will move upward slightly ahead of the sleeve 41. However, should there be a failure of the hydraulic system, the movement of the manually operated lever 60 will be directly communicated through the linkages to the sleeves 41 which will then move the piston 34 upward and actuate the band brakes.

The provision of two aligned shafts 53 instead of a single continuous shaft for operation of both toggles 46 is for the purpose of providing an adjustment to compensate for difference in wear or differences in adjustment of the two band brakes 10. It will be noted that there is a single motivating lever 55 associated with the two shafts 53 and that motion from this lever 55 is transmitted to the shafts 53 through the two ratchets 54, which make possible separate rotation of one of the shafts 53 ahead of the other to compensate for excessive wear of one of the band brakes 10.

In the operation of the drawworks, the driller engages the clutch associated with the spool 12 as the brake is released. Should he engage the clutch so as to drive the drum before the release of the brake, there will be a kick-back transmitted through the brake band, which will be absorbed to a great extend by downward movement of the bar 26 against the compression of the spring 32. The toggle 46 does not interfere with this kickback action, for the reason that the link 51 extends substantially horizontally, and therefore may swing downward as the toggle 46 moves bodily downward during the kick-back action.

I claim as my invention:

1. In a brake device of the character described, for use with a brake drum, the combination of: a band surrounding said drum, said band having ends lying in adjacent relation at the front of said drum; a guide member extending across the front of said drum; first connecting means to connect one of said ends of said band to said guide member; a body movable along said guide member; second connecting means to connect said body to the other of said ends of said band; hydraulic means for producing relative movement of said body and said guide member, whereby said body and said first connecting means will be moved relatively toward each other to constrict said band; a toggle operative between said guide member and said body to produce relative movement of said body and said first connecting means whereby said band will be constricted; a first shaft having means for connecting it operatively to said hydraulic means; a lever for rotating said shaft; a second shaft having means for transmitting rotation to said toggle; and a second lever mounted on said second shaft, and being adapted to actuate said toggle in event of failure of said hydraulic means.

2. In a brake device of the character described, for use with a brake drum, the combination of: a band surrounding said drum, said band having ends lying in adjacent relation at the front of said drum; a guide member extending across the front of said drum; first connecting means to connect one of said ends of said band to said guide member; a body movable along said guide member; second connecting means to connect said body to the other of said ends of said band; hydraulic means for producing relative movement of said body and said guide member; whereby said body and said first connecting means will be moved relatively toward each other to constrict said band; toggle means for substantially duplicating said relative movement of said body and said guide member to constrict said band in event of failure of said hydraulic means; means for actuating said hydraulic means comprising a movable part which moves when operating force is applied to said hydraulic means; and means for transmitting operating movement from said movable part to said toggle means whereby said toggle means will constrict said band in event of failure of said hydraulic means.

3. In a brake device of the character described, for use with a brake drum, the combination of: a band surrounding said drum, said band having ends lying in adjacent relation at the front of said drum; a guide member extending across the front of said drum; first connecting means to connect one of said ends of said band to said guide member; a body movable along said guide member; second connecting means to connect said body to the other of said ends of said band; hydraulic means for producing relative movement of said body and said guide member, whereby said body and said first connecting means will be moved relatively toward each other to constrict said band; a toggle operating between said guide member and said body to produce relative movement of said body and said first connecting means whereby said band will be constricted; and a single means for actuating both said hydraulic means and said toggle, said single means being disposed so as to actuate said hydraulic means and said toggle means in close sequence so that in event of failure of said hydraulic means, said toggle will produce brake constricting relative movement of said body and said first connecting means.

4. In a brake device of the character described, for use with a brake drum, the combination of: a band surrounding said drum, said band having ends lying in adjacent relation at the front of said drum; a guide member extending across the front of said drum; first connecting means to connect one of said ends of said band to said guide member; a body movable along said guide member; second connecting means to connect said body to the other of said ends of said band; hydraulic means for producing relative movement of said body and said guide member, whereby said body and said first connecting means will be moved relatively toward each other to constrict said band; a toggle operative between said guide member and said body to produce relative movement of said body and said first connecting means whereby said band will be constricted; and a single means for actuating both said hydraulic means and said toggle.

5. In a brake device for the spool of a drawworks having brake drums at the ends thereof, the combination of: brake band means around each of said drums, each of said band means having ends spaced apart and being adapted for movement toward each other so as to constrict the band means; a pair of guide members, each of which is disposed adjacent to a face of one of said drums and in cooperative relation to said ends of one of said band means; a pair of connecting means on each of said guide members, connected respectively to said ends of said band means; hydraulic means for moving said connecting means relatively toward each other so that closing movement will be applied to said ends of said band means; and toggle means for moving said connecting means relatively toward each other so that closing movement may be applied to said ends of said band means in event of failure of said hydraulic means.

6. In a brake device for the spool of a drawworks having brake drums at the ends thereof, the combination of: brake band means around each of said drums, each of said band means having ends spaced apart and being adapted for movement toward each other so as to constrict the band means; a pair of guide members, each of which is disposed adjacent to a face of one of said drums and in cooperative relation to said ends of one of said band means; a pair of connecting means on each of said guide members, connected respectively to said ends of said band means; hydraulic means for moving said connecting means relatively toward each other so that closing movement will be applied to said ends of said band means; actuating means for said hydraulic means having a part which moves forward as force is applied to said hydraulic means; and toggle means for moving said connecting means relatively toward each other so that closing movement may be applied to said ends of said band means, said toggle means having a movable operating part arranged so as to receive movement from said part of said actuating means in event of failure of said hydraulic means.

7. In a brake device for the spool of a drawworks having brake drums at the ends thereof, the combination of: brake band means around each of said drums, each of said band means having ends spaced apart and being adapted for movement toward each other so as to constrict the band means; a pair of guide members, each of which is disposed adjacent a face of one of said drums and in cooperative relation to said ends of one of said band means; a pair of connecting means on each of said guide members, connected respectively to said ends of said band means; hydraulic means for moving said connecting means relatively toward each other so that closing movement will be applied to said ends of said band means; toggle means for moving said connecting means relatively toward each other so that closing movement may be applied to said ends of said band means in event of failure of said hydraulic means; mechanism for operating said hydraulic means, said mechanism having a lever; a shaft extending across a face of said spool; means for transmitting operating movement from said shaft to said toggle means; and means for transmitting operating movement from said lever to said shaft.

8. In a brake device for the spool of a drawworks having brake drums at the ends thereof, the combination of: brake band means around each of said drums, each of said band means having ends spaced apart and being adapted for movement toward each other so as to constrict the band means; a pair of guide members, each of which is disposed adjacent a face of one of said drums and in cooperative relation to said ends of one of said band means; a pair of connecting means on each of said guide members, connected respectively to said ends of said band means; hydraulic means for moving said connecting means relatively toward each other so that closing movement will be applied to said ends of said band means; toggle means for moving said connecting means relatively toward each other so that closing movement may be applied to said ends of said band means in event of failure of said hydraulic means; mechanism for operating said hydraulic means, said mechanism having a lever; a pair of shafts extending across a face of said spool; means for transmitting operating movement from said shaft to said toggle means; and ratchet means for transmitting operative movement from said lever to said shafts.

9. In a brake device for the spool of a drawworks having brake drums at the ends thereof, the combination of: brake band means around each of said drums, each of said band means having ends spaced apart and being adapted for movement toward each other so as to constrict the band means; a pair of guide members, each of which is disposed adjacent a face of one of said drums and in cooperative relation to said ends of one of said band means; a pair of connecting means on each of said guide members, connected respectively to said ends of said band means; hydraulic means for moving said connecting means relatively toward each other so that closing movement will be applied to said ends of said band means; toggle means for moving said connecting means relatively toward each other so that closing movement may be applied to said ends of said band means in event of failure of said hydraulic means; mechanism for operating said hydraulic means, said mechanism having a lever; a pair of shafts extending across a face of said spool; means for transmitting operating movement from said shaft to said toggle means; and adjustable means for transmitting movement from said lever to said shafts.

10. In a brake device for the spool of a drawworks having brake drums at the ends thereof, the combination of: brake band means around each of said drums, each of said band means having ends spaced apart and being adapted for movement toward each other so as to constrict the band means; a pair of connecting means connected respectively to said ends of said band means; hydraulic means for moving said connecting means relatively toward each other so that closing movement will be applied to said ends of said band means; mechanical means for moving said connecting means realtively toward each other so that closing movement may be applied to said ends of said band means in event of failure of said hydraulic means; mechanism for operating said hydraulic means, said mechanism having a lever; a pair of shafts extending across a face of said spool; mechanical means; and ratchet means for transmitting operative movement from said lever to said shafts.

11. In a brake device for the spool of a drawworks having brake drums at the ends thereof, the combination of: brake band means around each of said drums, each of said band means having ends spaced apart and being adapted for movement toward each other so as to constrict the band means; a pair of connecting means connected respectively to said ends of said band means; hydraulic means for moving said connecting means relatively toward each other so that closing movement will be applied to said ends of said band means; toggle means for moving said connecting means relatively toward each other so that closing movement may be applied to said ends of said band means in event of failure of said hydraulic means; mechanism for operating said hydraulic means, said mechanism having a lever; a pair of shafts extending across a face of said spool; means for transmitting operating movement from said shaft to said toggle means; and adjustable means for transmitting movement from said lever to said shafts.

EDWARD E. STEVENSON.